United States Patent
Bacchetta et al.

(10) Patent No.: US 6,428,205 B1
(45) Date of Patent: Aug. 6, 2002

(54) INTRAORAL DENTAL RADIOGRAPHIC FILM PACKET WITH COMFORT ENHANCING FOLDED EDGE

(75) Inventors: Richard W. Bacchetta; Scott H. Schwallie, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/533,867

(22) Filed: Mar. 24, 2000

(51) Int. Cl.[7] .............................................. A61B 19/04
(52) U.S. Cl. ........................................ 378/169; 378/168
(58) Field of Search ................................ 378/168, 169, 378/184, 38

(56) References Cited

U.S. PATENT DOCUMENTS

| | | |
|---|---|---|
| 1,537,925 A | 5/1925 | Bolin |
| 1,631,497 A | 6/1927 | Marler |
| 2,084,092 A | 6/1937 | Kenney |
| 4,626,216 A | 12/1986 | Strong-Grainger |
| 4,791,657 A | 12/1988 | Kirsch et al. |
| 4,805,201 A | 2/1989 | Strong-Grainger |
| 4,847,884 A | 7/1989 | Dove |
| 4,852,143 A | 7/1989 | Scheier et al. |
| 4,911,871 A | 3/1990 | Liese, Jr. |
| 4,912,740 A | 3/1990 | Liese |
| 4,913,288 A | 4/1990 | Tanaka |
| 4,922,511 A * | 5/1990 | Gay ............................ 378/169 |
| 5,044,008 A | 8/1991 | Jackson |
| 5,077,779 A | 12/1991 | Steinhausen, Jr. |
| 5,170,423 A | 12/1992 | Yurosko |
| 5,285,491 A | 2/1994 | Muylle et al. |
| 5,784,433 A | 7/1998 | Higa |

FOREIGN PATENT DOCUMENTS

| | | |
|---|---|---|
| EP | 0564011 | 10/1993 |
| FR | 2627076 | 8/1989 |

OTHER PUBLICATIONS

U.S. application No. 09/534,368, Bacchetta et al., filed Mar. 24, 2000.
U.S. application No. 09/534,372, Bacchetta et al., filed Mar. 24, 2000.
U.S. application No. 09/534,393, Bacchetta et al., filed Mar. 24, 2000.
U.S. application No. 09/534,370, Bacchetta et al., filed Mar. 24, 2000.
U.S. application No. 09/533,868, Resch et al., filed Mar. 24, 2000.
U.S. application No. 09/534,392, Earnhart et al., filed Mar. 24, 2000.
U.S. application No. 09/534,516, Resch et al., filed Mar. 24, 2000.

* cited by examiner

Primary Examiner—Robert H. Kim
Assistant Examiner—Hoon K. Song
(74) Attorney, Agent, or Firm—Mark G. Bocchetti

(57) ABSTRACT

An intraoral x-ray film packet is taught which includes an integrally formed comfort enhancing perimetric bracket. The packet comprises a pair of opposing outer sheets and a continuous enclosing seal bonding the two outer sheets together to form an envelope with a perimetric projection with a film chip residing in the envelope. The perimetric projection is folded over and affixed to the packet to form an integral perimetric bracket with a rounded or creased perimetric edge.

22 Claims, 4 Drawing Sheets

INTRAORAL DENTAL RADIOGRAPHIC FILM PACKET WITH COMFORT ENHANCING FOLDED EDGE

FIELD OF THE INVENTION

The present invention relates generally to x-ray film packets and, in particular, to intraoral radiographic film packets with comfort enhancing features.

BACKGROUND OF THE INVENTION

A common problem experienced by people visiting the dentist is the discomfort and pain associated with the taking of dental x-rays caused by the positioning of intraoral radiographic film packets in the patient's mouth. The typical intraoral radiographic film packet includes relatively hard and/or relatively sharp edges that press against and irritate the gums and other oral soft tissue of the person whose teeth are being x-rayed. A variety of intraoral x-ray dental packets are known in the prior art which include features intended to be comfort enhancing. In addition, attempts have been made to create comfort-enhancing structures into which intraoral-x-ray dental packets can be inserted prior to placement in the patient's mouth. One example of this type of structure is taught in U.S. Pat. No. 5,044,008 titled "Dental Film Cartridge Cushion," by Reginald B. Jackson, Aug. 27, 1991. Jackson utilizes a cartridge cushion comprising a foam sheet sandwich into which the x-ray dental packet is placed for the purpose of cushioning and increasing the comfort to the patient. Jackson requires the manual insertion of the x-ray packet into the cartridge cushion. Thus, Jackson adds significant bulk to the packet and enhances the possibility of triggering a gag reflex action in the patient. Additionally, after the cartridge cushion is removed from the packet, it would be possible to reuse the cartridge cushion which would not be sanitary.

A second example of an add-on structure is taught in U.S. Pat. No. 5,285,491 titled "Dental Film Packet," by Wilfried Muylle et al., Feb. 8, 1994. Muylle et al. teaches sealing a film pack in an envelope consisting of a pair of thin pockets of injection molded plastic which are sealed with a band of adhesive tape. The envelope has no sharp edges and generally rounded corners. Thus, as with Jackson's device, this device requires manual insertion of the packet, adds significant bulk to the packet, enhances the possibility of triggering a gag reflex in the patient, and can also be reused in a non-sanitary manner.

U.S. Pat. No. 1,631,497 titled "Dental X-ray Film Package," by Harry L. Marler, Jun. 7, 1927, teaches a dental x-ray film package wherein a sensitized sheet is sandwiched between two opaque sheets. A heavy band of rubber is stretched about the periphery of the package to hold the package securely together and to provide the light tight joint.

U.S. Pat. No. 1,537,925 titled "Dental X-ray Film Package," by Leonard M. Bolin, May 12, 1925, teaches a dental x-ray film package wherein a pair of film sheets and the cover sheet are inserted into a container. The container consists of a frame including a backing portion in an enlarged continuous beading about the periphery thereof. The beading must be forced away from the backing portion and stretched peripherally in order to insert the film sheets and cover sheet therein. The container thus serves to hold the package together and provide the light seal.

U.S. Pat. No. 4,791,657 titled "Intraoral Radiographic Film Packet," by Alan Kirsch et al., Dec. 13, 1988, teaches a dental radiographic film packet which includes soft corners for greater patient comfort. The packet is constructed by removing all material from the corners of a typical dental radiographic film packet with the exception of the film chip. Individual corner covers which are seamless pockets are then added to the four corners of the packet. The corner covers create an airspace at each corner around the edge of the film chip.

U.S. Pat. No. 2,084,092 titled "Dental Film Holder," by Ralph Kenney, Jun. 15, 1937, teaches a dental film holder that is a stretchable vellum rubber plate with integral corner pockets into which an x-ray dental packet may be manually inserted. Kenney's dental film holder is intended to be reusable.

From the foregoing it can be seen that many attempts to add a comfort enhancing feature to dental x-ray film packets have resulted in structures requiring manual assembly and/or modification of individual film packets in order to receive a comfort enhancing structure. Further, such prior art attempts have failed to provide a dental x-ray film packet in which the comfort enhancing feature is formed integrally therewith during manufacture and without requiring manual assembly.

SUMMARY OF THE INVENTION

It is therefore the object of the present invention to provide an intraoral radiographic film packet with a comfort enhancing perimeter.

It is a further object of the present invention to provide an intraoral radiographic film packet which has a comfort enhancing perimeter integrally formed therewith.

Yet another object of the present invention is to provide an intraoral radiographic film packet including a comfort enhancing perimeter which does not significantly increase the bulk of the film packet.

Still another object of the present invention is to provide a comfort enhancing perimeter feature for an intraoral radiographic film packet that cannot be reused in a non-sanitary manner.

The foregoing and numerous other features, objects and advantages of the present invention will become readily apparent upon a review of the detailed description, claims and drawings set forth herein. These features, objects and advantages are accomplished by forming a larger die cut sheet for each of the outer sheets that form the envelope of the dental x-ray film packet. When such enlarged outer sheets are perimetrically sealed together, an extended perimetric laminated edge is created. That extended perimetric laminated edge is folded over on all four sides of the packet and sealed onto itself so that the cut edges of the outer sheets no longer form the outer edge of the packet. Thus, the die cut edges of the packet do not directly engage the soft/sensitive tissues of the patient's mouth. The cut edges have been identified as the features of the x-ray dental packets that cause patient discomfort. By folding over and sealing the extended perimetric laminated edge a generally rounded perimetric edge is created and it is this feature that comes in contact with the soft/sensitive tissues of the patient's mouth. This perimetric edge can alternatively be creased and still provide a significant comfort advantage over a perimetric die cut edge.

In an alternative embodiment of the present invention only one of the outer sheets is enlarged. An envelope for the packet is still generated by sealing the two outer sheets together at the perimeter on the smaller of the two outer sheets. Then the perimeter portion of the enlarged sheet can be folded over and sealed to create a generally rounded perimetric edge. As with the embodiment discussed above, the folded perimetric edge may be creased and still provide a significant comfort advantage over a perimetric die cut edge. In both embodiments, the width of the actual seal may be limited so that a perimetric loop is generated forming a hollow perimetric cushion.

DETAILED DESCRIPTION OF THE INVENTION

Figure 1:
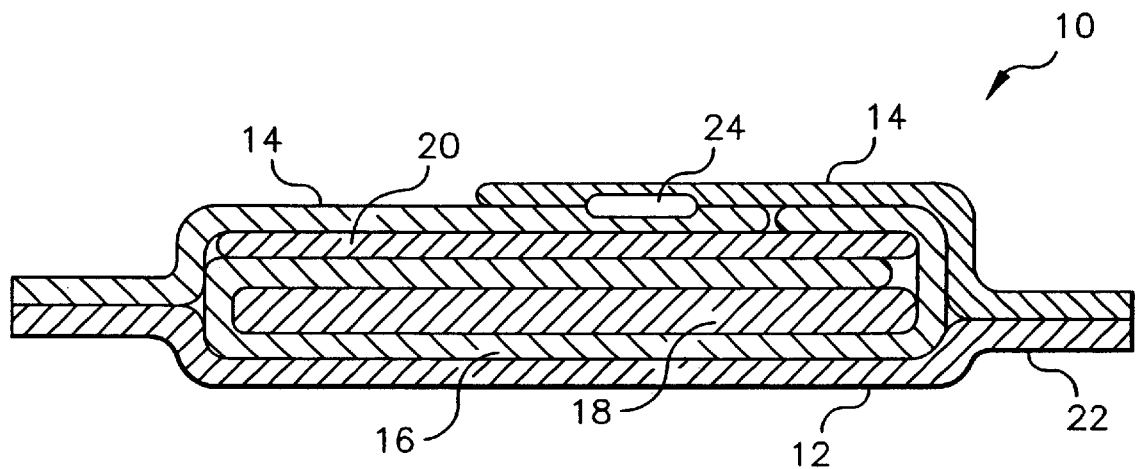
FIG. 1 is a cross-sectional view of a typical prior art dental film packet.

Turning first to FIG. 1, there is shown a cross-section of a typical prior art dental film packet 10. Dental film packet 10 includes an outer envelope comprising a vinyl sheet 12 on one face of the dental film packet 10 and a pair of overlapping vinyl sheets 14 on the opposite face thereof. Contained between the sheet 12 and overlapping sheets 14 are a paper wrap element 16, a film chip 18 and a lead foil 20. Vinyl sheets 12 and 14 project beyond dimensions of the paper wrap element 16, the film chip 18 and lead foil 20 to yield a perimetric edge 22. Laminated perimetric edge 22 allows for heat sealing of vinyl sheets 12 and 14 to one another to yield a light tight perimeter to the dental film packet 10. In addition, a heat seal 24 is generated at the overlap of vinyl sheets 14 to provide an outer envelope which is completely light tight and which is substantially watertight. This prior art dental film packet 10 therefore includes a relatively stiff and sharp perimetric edge created by the laminated perimetric edge 22. It is this relatively stiff and sharp perimetric edge which causes discomfort to the patient.

Figure 2:
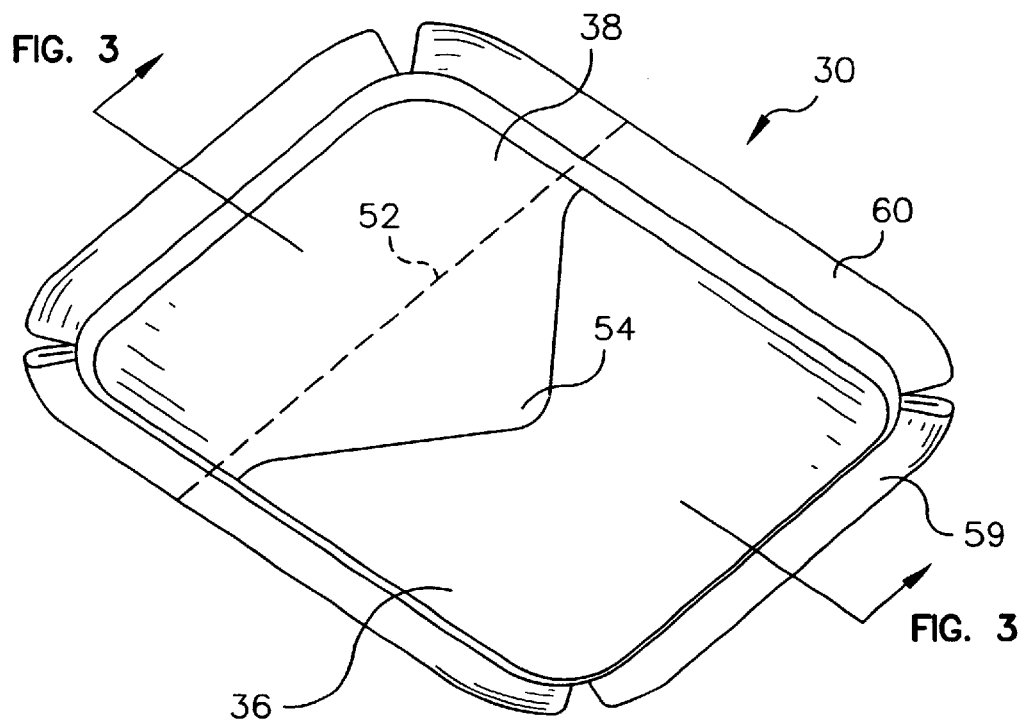
FIG. 2 is a perspective view of the intraoral radiographic film packet with comfort enhancing features of the present invention.
Figure 3:
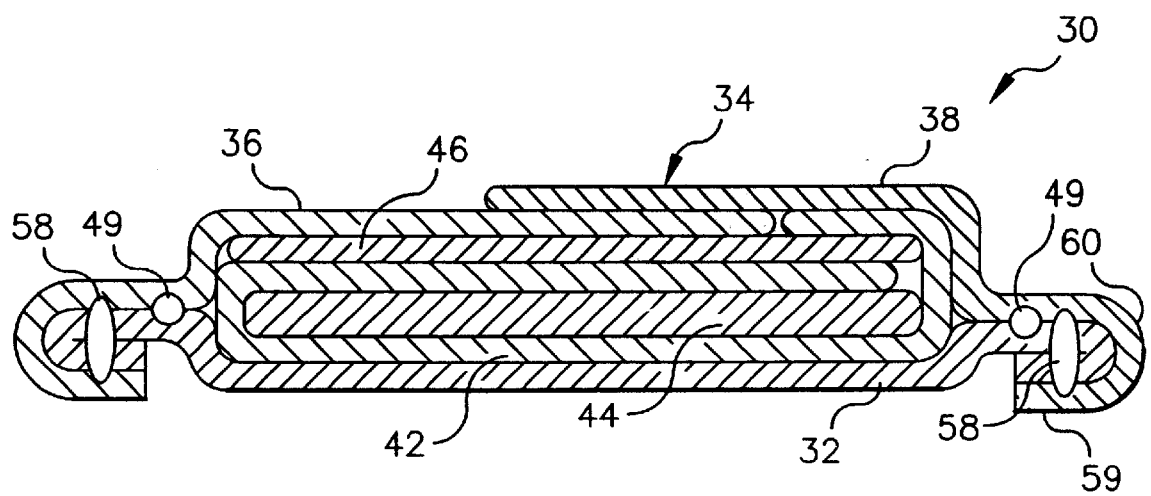
FIG. 3 is a cross-sectional view of the intraoral radiographic film packet of the present invention taken along line 3—3 of FIG. 2.
Figure 4:
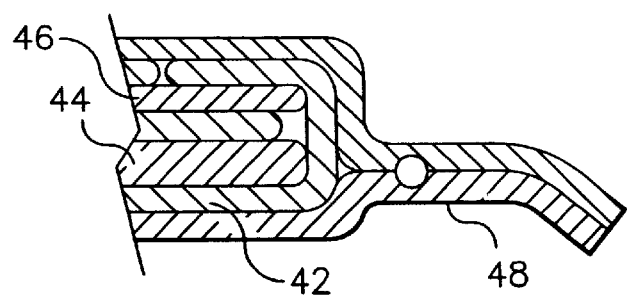
FIG. 4 is a partial cross-sectional view of the intraoral radiographic film packet of the present invention prior to the perimetric edge being folded over and sealed to create a perimetric bracket with a rounded or folded edge.

Turning next to FIGS. 2, 3 and 4, there is shown the dental film packet 30 of the present invention. Dental film packet 30 includes an envelope comprising a first outer sheet 32 and an opposing second outer sheet 34. Second outer sheet 34 is actually comprised of a pair of overlapping sections 36 and 38. Outer sheets 32 and 34 are preferably made of a soft thermoplastic material such as, but not limited to polyvinyl chloride (PVC), or ethylene vinyl acetate (EVA). Sandwiched between outer sheets 32 and 34 are the typical elements found in a dental x-ray film packet. There is a paper wrap element 42, the film chip 44 and a lead foil 46. The dental x-ray film packet 30 is assembled by placing the paper wrap element 42, the film chip 44 and a lead foil 46 between outer sheets 32 and 34 and sealing the outer sheets 32 and 34 to one another form a two-ply perimetric edge 48. Two-ply perimetric edge 48 can be formed by heat sealing, RF sealing, ultrasonic sealing, or any other sealing mechanism which can create a substantially airtight bond between outer sheets 32 and 34. The continuous enclosing seal (indicated by dot 49) can be positioned anywhere in the two-ply perimetric edge 48 but is preferably positioned to yield an envelope in which the paper wrap element 42, the film chip 44, and the lead foil 46 snugly reside. There is also a transverse seal (indicated by line 52) affixing overlapping sections 36 and 38 together. Overlapping section 38 is preferably formed with a tab portion 54 that extends past transverse seal 52 to facilitate removal of the envelope for extraction and development of the film chip 44 after exposure. Outer sheets 32 and 34 are large enough to create an extended two-ply perimetric edge 48 that is at least about twice the width of the die cut laminated perimetric edge of the prior art. A typical existing packet is approximately 1¾ inches long by 1¹¹⁄₃₂ inches wide. The laminated edge portion is nominally ¹⁄₃₂ inch wide. By increasing the width and length dimensions by ¹⁄₁₆ inch, provision is made for an additional ¹⁄₃₂ inch per side to be folded to practice this invention. The extended two-ply perimetric edge 48 is folded over and sealed or attached to itself resulting in a perimetric bracket 59 having a generally rounded or creased perimetric edge 60. The attachment is made preferably by means of RF sealing, induction sealing, ultrasonic sealing, or the use of adhesive resulting in a foldover seal (indicated by seal 58). The entire width of perimetric bracket 59 may be subject to sealing, or only a portion of the width of perimetric bracket 59 may be sealed. The rounded or creased perimetric edge 60 is to provide a cushioning barrier to the hard interior components of the packet 30. The cut edges of the extended two-ply perimetric projection 48 are interior to the rounded or creased perimetric edge 60, and therefore, contact of these cut edges with the soft tissues of a patient's mouth is eliminated. In such manner, an intraoral radiographic film packet 30 can be manufactured which has a comfort enhancing perimeter integrally formed therewith. It should be apparent that seals 49 and 58 can be replaced with a single seal 63 as depicted in FIG. 6.

Figure 5:
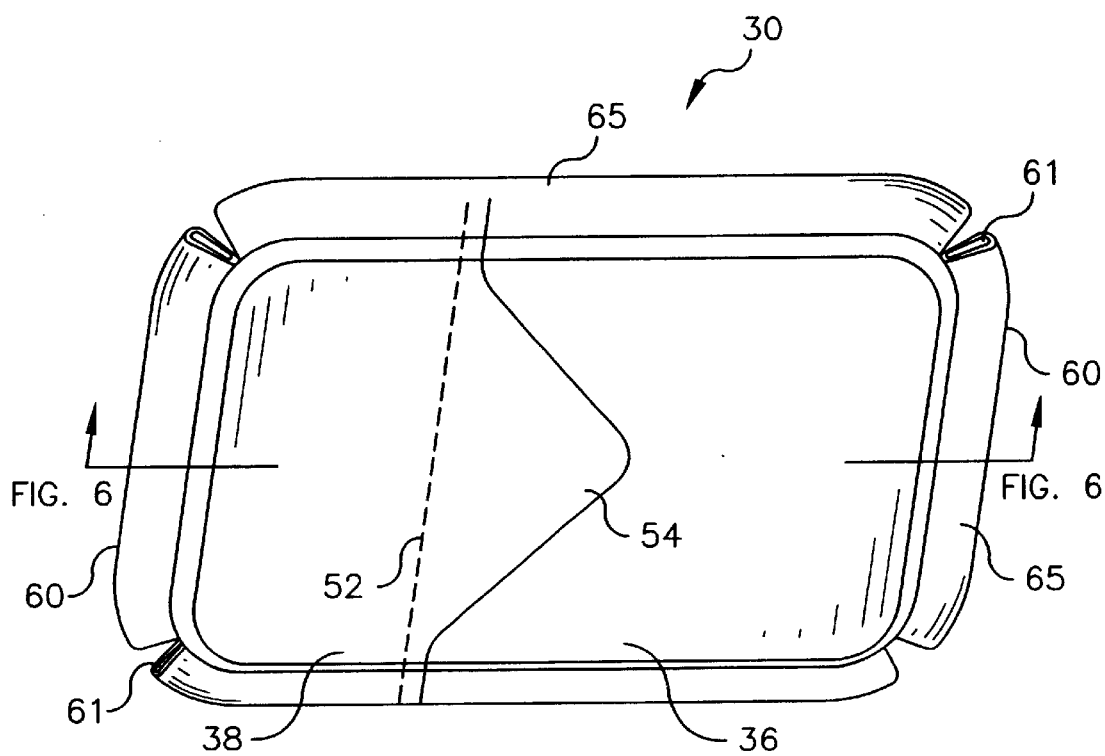
FIG. 5 is a perspective view of a first alternative embodiment of the intraoral radiographic film packet of the present invention wherein the integrally formed perimetric bracket is rounded to form a hollow cushion.
Figure 6:
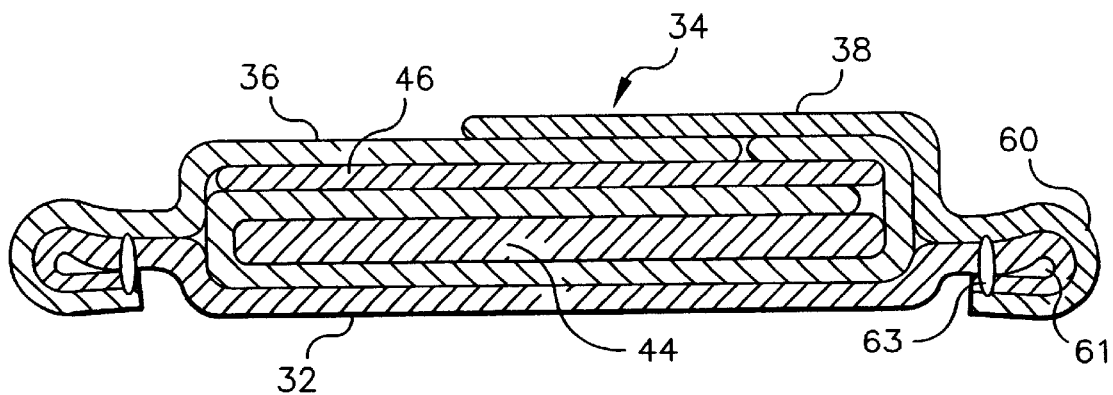
FIG. 6 is a cross-sectional view taken along line 6—6 of FIG. 5.

A first alternative embodiment of the present invention is depicted in FIGS. 5 and 6. It is identical to the embodiment shown in FIGS. 2–4 with the exception that a single seal 63 has replaced seals 49 and 58 and the location of seal 63 is such that an open loop is formed resulting in a hollow cushion 61 in perimetric bracket 65.

Figure 7:
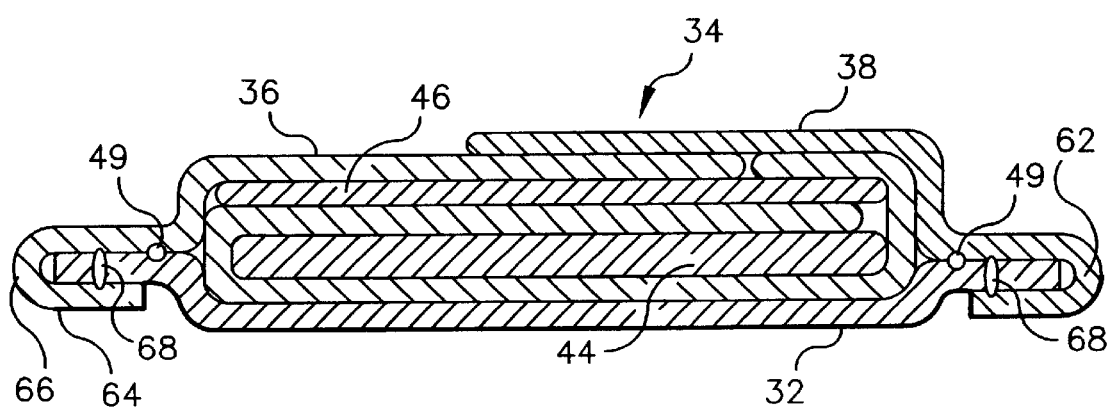
FIG. 7 is a cross-sectional view of a second alternative embodiment of the intraoral radiographic film packet of the present invention shown in FIGS. 2–4.

A second alternative embodiment of the present invention is depicted in FIG. 7 which is identical to the embodiment shown in FIGS. 2–4 with the exception that only outer sheet 34 has been enlarged. This results in what is primarily a single ply perimetric projection which is folded over and sealed or attached to itself resulting in a perimetric bracket 64 having a generally rounded or creased perimetric edge 66. The attachment is made preferably by means of RF sealing, induction sealing, ultrasonic sealing, or the use of adhesive resulting in a foldover seal (indicated by spot 68). As with the preferred embodiment of FIGS. 2–4, the entire width of perimetric bracket 64 may be subject to sealing, or only a portion of the width of perimetric bracket 64 may be sealed. When only a portion of the width of perimetric bracket 64 is sealed an open loop is formed resulting in a hollow cushion.

With either embodiment of the present invention discussed above, it may be advantageous to provide slits at the corners of the extended two-ply perimetric edge 48, or at the corners of the single-ply perimetric projection 62. Such slits would facilitate folding of the extended two-ply perimetric edge 48 and of the single-ply perimetric projection 62 at the corners thereof. With two or more generally radial slits provided at each corner, sharp ninety degree corners can be avoided. Due to overlap at the corner s as a result of folding it may be advantageous to have the generally radial slits intersect to thereby remove a portion of the outer sheet at each corner. Sharp ninety degree corner s can also be avoided by folding over each corner at, for example, an angle of 45° from the edges of the packet and fixing the folded corners in such position by sealing or other attachment means.

Those skilled in the art will appreciate that dental x-ray packet 30 of the present invention can be made with the current industry standard dimensions for length, width and thickness while still incorporating the integrally formed comfort enhancing perimeter. This has the added benefit of allowing the use of existing after market holders and dispensers without the modification of such devices, or requiring the purchase of new devices for performing such functions.

Those skilled in the art will also recognize that there are now digital radiography products available which are intended to be used in place of dental x-ray film packets. One example of this type of technology uses a plate that is coated with phosphorous. When exposed to radiation, the plate will create an image that can be scanned with a laser into a computer instead of being chemically processed. To the extent that these products have the same problems of patient discomfort, the present invention can be used to solve such problems. Similarly, intraoral products which use a CCD sensor array may also achieve some level of comfort benefit through the application of the present invention.

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in an illuminating sense.

Parts List

10 dental film packet (prior art)
12 outer envelope comprising a vinyl sheet
14 outer envelope comprising overlapping vinyl sheets
16 paper wrap element
18 film chip
20 lead foil
22 laminated perimetric edge
24 heat seal
30 dental film packet (present invention)
32 outer envelope comprising a first outer sheet
34 outer envelope—opposing second outer sheet
36 overlapping sections
38 overlapping sections
42 paper wrap element
44 film chip
46 lead foil
48 perimetric edge
49 seal
52 transverse seal
54 tab portion
58 seal
59 perimetric bracket
60 rounded perimetric edge
61 hollow cushion
63 seal
64 perimetric bracket
65 perimetric bracket
rounded or creased perimetric edge
foldover seal

What is claimed is:

1. An intraoral x-ray film packet comprising:
   (a) an outer envelope including a perimetric projection; and
   (b) a film chip contained within said outer envelope, said perimetric projection being folded over and affixed to the packet to form a rounded or creased perimetric edge.

2. An intraoral x-ray film packet comprising:
   (a) a first outer sheet;
   (b) a second outer sheet;
   (c) a film chip residing between said first outer sheet and said second outer sheet; and
   (d) a continuous enclosing seal affixing said first outer sheet and said second outer sheet and forming an envelope with a perimetric projection, said film chip residing in said envelope, said perimetric projection being folded over and affixed to the packet to form an integral perimetric bracket with a rounded or creased perimetric edge.

3. An intraoral x-ray film packet as recited in claim 2 wherein:
   said second outer sheet comprises a pair of overlapping sections.

4. An intraoral x-ray film packet as recited in claim 3 wherein:
   said second outer sheet further comprises a transverse seal affixing said pair of overlapping sections.

5. An intraoral x-ray film packet as recited in claim 4 wherein:
   one of said pair of overlapping sections includes a tab portion to facilitate removal of said first and second outer sheets.

6. An intraoral x-ray film packet as recited in claim 2 wherein:
   said first and second outer sheets are made from a thermoplastic material.

7. An intraoral x-ray film packet as recited in claim 2 wherein:
   said perimetric seal is formed by RF sealing.

8. An intraoral x-ray film packet as recited in claim 2 wherein:
   said perimetric seal is formed by heat sealing.

9. An intraoral x-ray film packet as recited in claim 4 wherein:
   said transverse seal is formed by RF sealing.

10. An intraoral x-ray film packet as recited in claim 4 wherein:
    said transverse seal is formed by heat sealing.

11. An intraoral x-ray film packet as recited in claim 2 wherein:
    said first and second outer sheets have substantially the same dimensions so that said perimetric projection is a two-ply perimetric projection.

12. An intraoral x-ray film packet as recited in claim 2 wherein:

said first outer sheet is larger than said second outer sheet, said perimetric projection being a single-ply.

13. An intraoral x-ray film packet as recited in claim 11 wherein:
said integral perimetric bracket forms a hollow perimetric cushion.

14. An intraoral x-ray film packet as recited in claim 12 wherein:
said integral perimetric bracket forms a hollow perimetric cushion.

15. An intraoral x-ray film packet as recited in claim 1 wherein:
said perimetric projection is affixed to the packet by RF sealing.

16. An intraoral x-ray film packet as recited in claim 2 wherein:
said perimetric projection is affixed to the packet by RF sealing.

17. An intraoral x-ray film packet as recited in claim 1 wherein:
said perimetric projection is affixed to the packet by heat sealing.

18. An intraoral x-ray film packet as recited in claim 2 wherein:
said perimetric projection is affixed to the packet by heat sealing.

19. An intraoral x-ray film packet as recited in claim 1 wherein:
said perimetric projection is affixed to the packet by ultrasonic sealing.

20. An intraoral x-ray film packet as recited in claim 2 wherein:
said perimetric projection is affixed to the packet by ultrasonic sealing.

21. An intraoral x-ray film packet as recited in claim 1 wherein:
said perimetric projection has a gap at each corner thereof.

22. An intraoral x-ray film packet as recited in claim 2 wherein:
said perimetric projection is generally rectangular and a corner section at each of the four corners thereof to yield a gap at each of the four corners of the integral perimetric bracket.

* * * * *